(12) United States Patent
Van Rijsewijk

(10) Patent No.: US 10,081,447 B2
(45) Date of Patent: Sep. 25, 2018

(54) SPREADING UNIT, CONTAINER SLEEVING DEVICE AND METHOD FOR SLEEVING CONTAINERS

(71) Applicant: FUJI SEAL INTERNATIONAL, INC., Osaka-shi, Osaka (JP)

(72) Inventor: Lucas Van Rijsewijk, Boxtel (NL)

(73) Assignee: FUJI SEAL INTERNATIONAL, INC., Osaka (JP)

( * ) Notice: Subject to any disclaimer, the term of this patent is extended or adjusted under 35 U.S.C. 154(b) by 491 days.

(21) Appl. No.: 14/753,794

(22) Filed: Jun. 29, 2015

(65) Prior Publication Data
US 2015/0344159 A1 Dec. 3, 2015

Related U.S. Application Data

(63) Continuation of application No. 14/723,045, filed on May 27, 2015, now abandoned.

(30) Foreign Application Priority Data

May 28, 2014 (NL) ...................................... 2012911

(51) Int. Cl.
| | | |
|---|---|---|
| *B65B 9/14* | (2006.01) | |
| *B29C 63/42* | (2006.01) | |
| *B65C 3/06* | (2006.01) | |

(52) U.S. Cl.
CPC .............. *B65B 9/14* (2013.01); *B29C 63/423* (2013.01); *B65C 3/065* (2013.01)

(58) Field of Classification Search
CPC .......... B65B 9/14; B29C 63/423; B65C 3/065
(Continued)

(56) References Cited

U.S. PATENT DOCUMENTS

| | | | | |
|---|---|---|---|---|
| 4,016,704 A | * | 4/1977 | Fujio .................... | B29C 31/002 |
| | | | | 156/521 |
| 4,102,728 A | | 7/1978 | Smith | |

(Continued)

FOREIGN PATENT DOCUMENTS

| | | |
|---|---|---|
| EP | 2 551 206 A1 | 1/2013 |
| EP | 2567901 A1 | 3/2013 |

(Continued)

OTHER PUBLICATIONS

Feb. 18, 2015 Search Report issued in Dutch Patent Application No. NL 2012911.

(Continued)

*Primary Examiner* — Robert Long
*Assistant Examiner* — Xavier A Madison
(74) *Attorney, Agent, or Firm* — Oliff PLC

(57) ABSTRACT

A spreading unit for a container sleeving device, configured to spread open flattened tubular foil material to form a sleeve, to bring the sleeve in a target tubular shape and to discharge the sleeve towards the container, the spreading unit including a mandrel including: an upstream mandrel element for spreading open the flattened tubular foil material having a substantially constant cross-section in axial direction; a downstream mandrel element having a non-constant cross-section in axial direction; an intermediate mandrel element positioned between the upstream and downstream mandrel elements; wherein the downstream mandrel element comprises flaring sides and tapering sides and the intermediate mandrel element is recessed relative to the upstream mandrel element to allow the upstream part of a sleeve to move radially inward when the downstream part of the sleeve moves along the flaring sides of the downstream mandrel element.

31 Claims, 11 Drawing Sheets

(58) Field of Classification Search
USPC .......................................... 53/585; 156/229
See application file for complete search history.

(56) References Cited

U.S. PATENT DOCUMENTS

| | | |
|---|---|---|
| 2005/0126715 A1 | 6/2005 | Hong |
| 2010/0163164 A1* | 7/2010 | Deonarine ............ B65B 21/247 156/229 |
| 2013/0061559 A1* | 3/2013 | Van Rijsewijk ...... B29C 63/423 53/381.5 |

FOREIGN PATENT DOCUMENTS

| | | |
|---|---|---|
| WO | 2011/031160 A1 | 3/2011 |
| WO | 2011/104917 A1 | 9/2011 |

OTHER PUBLICATIONS

Feb. 18, 2015 Written Opinion issued in Dutch Patent Application No. NL 2012911.

* cited by examiner

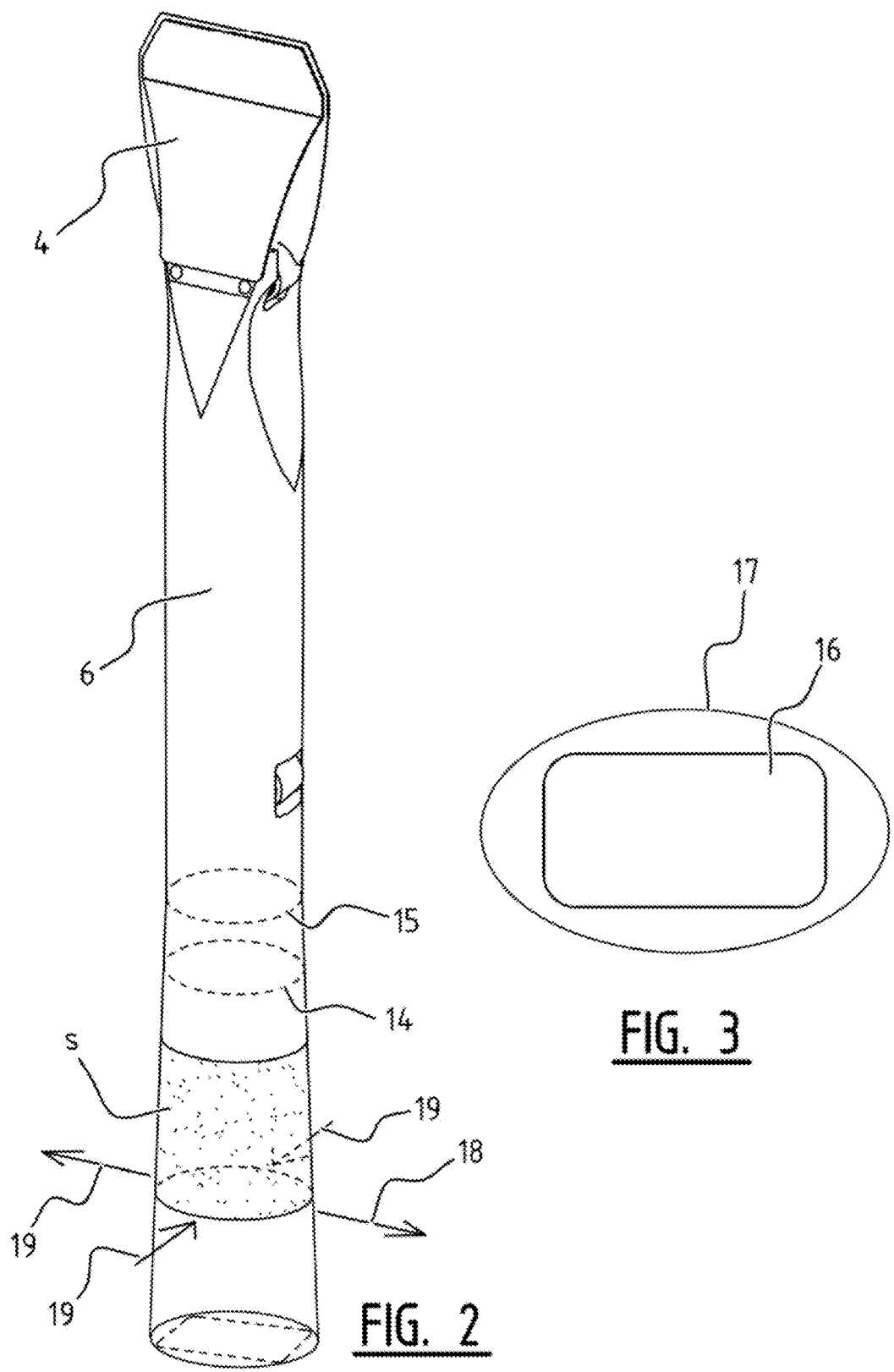

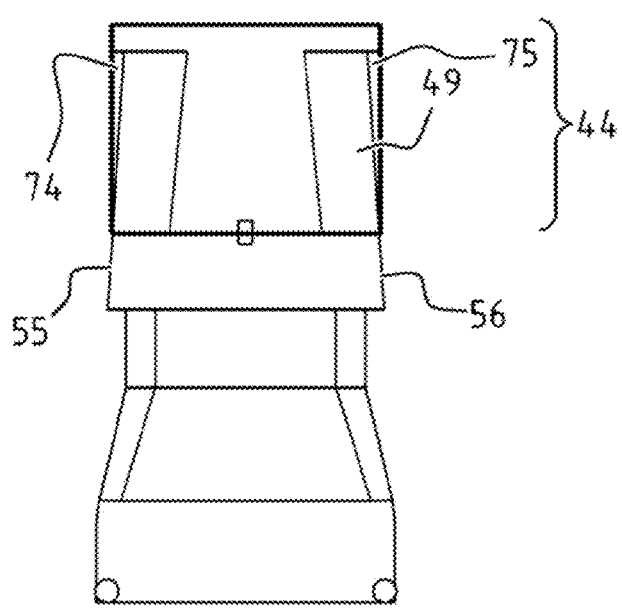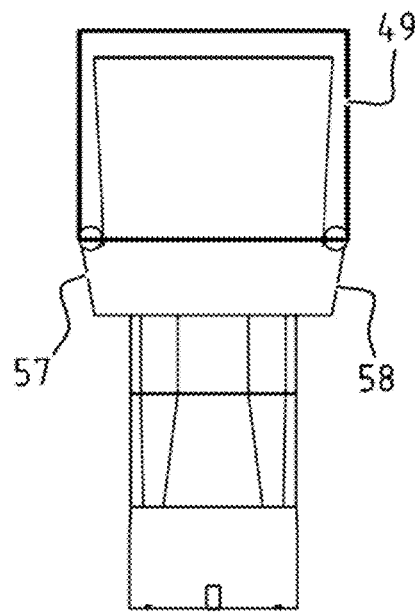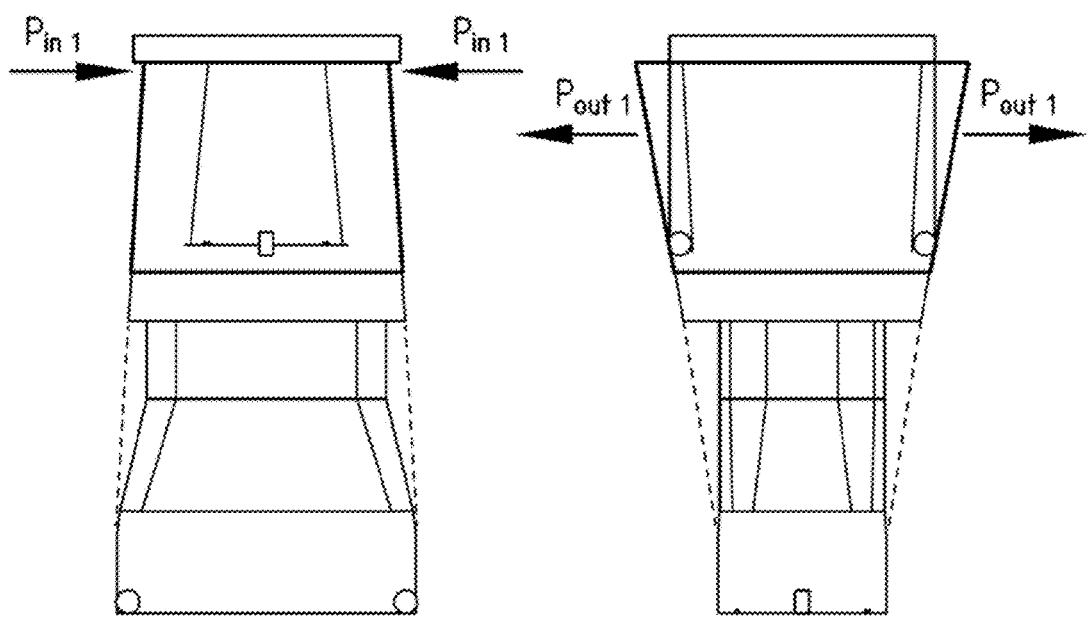
FIG. 6A  FIG. 7A
FIG. 6B  FIG. 7B

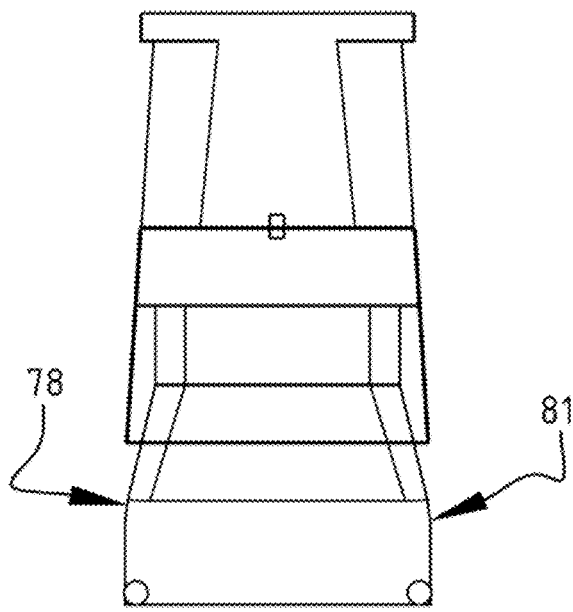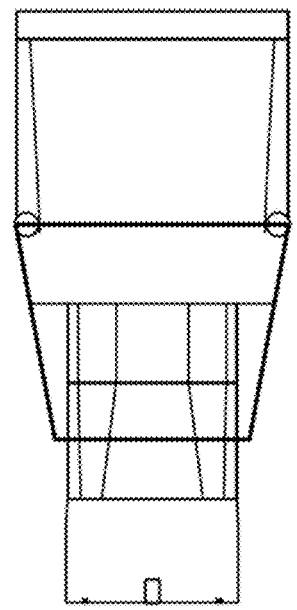
FIG. 6C          FIG. 7C
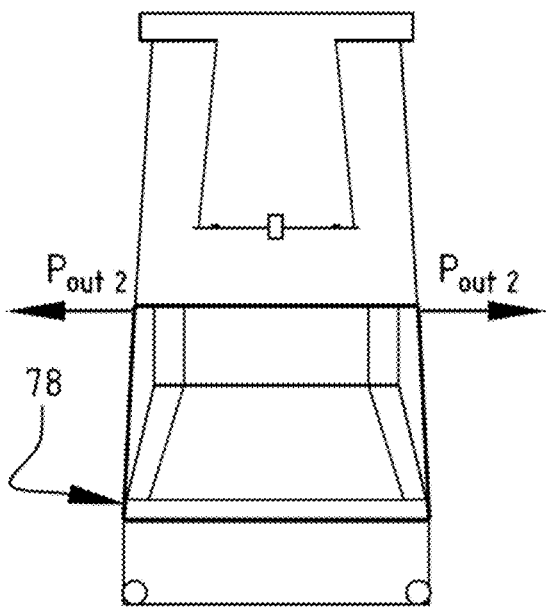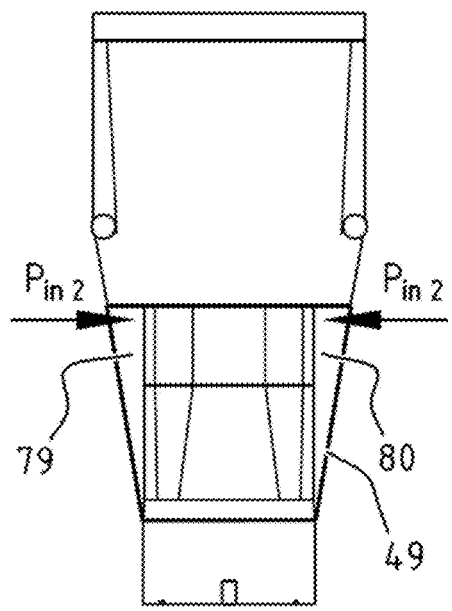
FIG. 6D          FIG. 7D

SPREADING UNIT, CONTAINER SLEEVING DEVICE AND METHOD FOR SLEEVING CONTAINERS

This is a Continuation of application Ser. No. 14/723,045 filed May 27, 2015, which claims the benefit of Netherlands Application No. NL2012911 filed May 28, 2015. The disclosure of the prior applications are hereby incorporated by reference herein in their entirety.

The present invention relates to a spreading unit for a container sleeving device, the spreading unit being configured to spread open flattened tubular foil material to form a sleeve, to bring the sleeve in a target tubular shape and to discharge the sleeve towards the container, the spreading unit comprising a mandrel comprising an upstream mandrel element for spreading open the flattened tubular foil material, the upstream mandrel element having a substantially constant circumference in axial direction. The invention also relates to a container sleeving device comprising such spreading unit and to a method for sleeving containers.

An example of such container sleeving device is disclosed in international publication WO 2011/031160 A1. In this known container sleeving device tubular foil material is supplied around an elongated mandrel. The mandrel comprises an inlet side configured as a flat element portion, an outlet side configured as a cylindrical element portion and a transition area located between the inlet and outlet side. The flat element receiving the flattened tubular material widens towards the transition area in a direction perpendicular to the plane of the flat element portion so that the flattened tubular material is opened while moving along the mandrel. The opened tubular mandrel is cut into individual sleeves and the sleeves are consecutively discharged towards containers conveyed along a trajectory below the mandrel. The mandrel in the known container sleeving device has a constant circumference in the axial direction, i.e. in the direction from the inlet side to the outlet side they have a circular cross-section, and sleeves are in a cylindrical shape when they are discharged to the containers. The containers here are relatively slim products, such as bottles and the like.

For differently shaped containers, such as packets for laundry detergents or similar products, the sleeve discharged towards the containers should have a more elongated shape, for instance with an oval cross-section. It is known to use so-called tapered mandrels in order to create and discharge such more elongated sleeves to the containers (i.e. sleeves having a non-round cross-section). Downstream of the flat element which brings the flat tubular shape to an open shape having a circular cross section, the mandrel has a mandrel element shaped to bring the sleeve into a different shape when the sleeve is moved along the mandrel.

FIG. 1 shows two examples of existing tapered mandrels 1,2 that are used to provide sleeves having a non-round cross section. At the respective tops 3,4 of the mandrels the cross-section 9 is flat so that the flattened tubular foil material may be easily applied on the mandrel. In the transition sections 5,6 of the mandrel the cross section 10 is round (circular) so that the opened tubular material takes an essential cylindrical form. The outlet ends 7,8 of the mandrels 3,4 show a widening shape wherein the cross section shape is oval (of any similar form) so that the opened foil material is given an elongated shape 11 (for instance an oval shape) in cross section. Transfer units are provided to cause the tubular foil material to move along the outer surface of the mandrel. Cutting units are provided (shown only schematically in the drawing) with which the foil material can be cut to an appropriate length (cutting length CL) to form an individual sleeve. The mandrel 2 has a cutting unit arranged at a cutting position 13 downstream of the transition line 15 between the transition (round) section of the mandrel 4 and the final (oval) section of the mandrel. By contrast, in the mandrel 1, the transition line 14 is positioned downstream of the cutting position 12 of the cutting unit. In both types of mandrel the maximum amount of widening of the lower (end) sections 7,8 of the mandrel 1,2 is restricted. In practice the angle (a) between the axial direction and the side surface of the widening (flaring) section should not be larger than about 3 degrees if a quality loss such as pigtails is to be avoided. This puts a limit to the reshaping of the sleeves drastically and makes the known mandrels less suitable for handling large sized (elongated) containers.

One solution may be to increase the length of the widening sections of the mandrel and add further transfer units. However, this would increase the costs, make the sleeving device rather bulky and/or could have a negative impact on the sleeving reliability.

FIG. 2 is a side view of the mandrel 2 of FIG. 1 including a sleeve (S). The length (cutting length CL) of the sleeve (S) is shown in the figure. The widening started by the widening section 8 of the mandrel 2 continues below the bottom of the mandrel. The sleeve length (CL) in combination with the above mentioned maximum angle limit determines the final shape of the sleeve near a container (C) that can be reached using the current type of mandrel.

FIG. 3 shows a cross section of a typically elongated container shape 16 and the shape 17 of the sleeve that is being arranged around this container. As can be derived from FIG. 3 the sleeve oversize for the type of mandrels shown in FIG. 1 is large and generally much larger than for ordinary round mandrels. Longer sleeves of course allow for more tapering of the sleeve, but the length of the sleeve is not always available. Due to the known mandrel setup the oversize is generally too large, resulting in lower shrink quality and less accurate orientation of the sleeve on the container.

Another disadvantage of the known mandrels is that because the sleeve is reshaping as it is moving from the widening section 8 of the mandrel, the sleeve is also unstable. The short radius parts of the oval sleeve move outward (see arrows 18 in FIG. 2) generate stiffness as a result of their small radii. However, the long radius parts are moving inward (arrows 19, FIG. 2) and is also "catching wind" because of its movement. Both effects can cause the sleeve to collapse. This is especially the case at higher production speeds, i.e. higher speeds of the foil material moving along the mandrel, and in case of large length/width ratios of the sleeve. In the latter case, the length of the sleeve is large relative to its width (diameter). Due to its large length the stiffness at the downstream part of the sleeve is comparably small, which even increases the risk of the sleeve to collapse.

A further drawback of the known mandrels is that reshaping of the sleeve as a result of the widening section of the mandrel may cause the sleeve to curl. At the position where the sleeve is pushed outward, the curl is upward. At the positions where the sleeve is moved inward, the curl is downward. If the sleeve is cut in this curled position, the cut may show a waved cutting line. A waved cutting line means that the upper edge of the sleeve attached to the container is not straight.

EP 2 567 901 A1 discloses a spreading unit for a container sleeving device. This spreading unit is not suitable for (or at least less so) arranging sleeves around containers having a large length-width ratio.

It is an object of the present invention to provide a spreading unit, a sleeving device and a method for sleeving containers according to the above preamble wherein at least one of the above identified and/or other disadvantages of the prior art has been reduced or even removed.

It is a further object of the invention to provide a spreading unit, a sleeving device and a method for sleeving containers wherein sleeves can be accurately arranged on containers with a large length/width ratio.

According to an aspect of the invention at least one of the objects may be achieved in a spreading unit for a container sleeving device, the spreading unit being configured to spread open flattened tubular foil material to form a sleeve, to bring the sleeve in a target tubular shape and to discharge the sleeve towards the container, the spreading unit comprising a mandrel comprising:

an upstream mandrel element for spreading open the flattened tubular foil material, the upstream mandrel element having a substantially constant circumference in axial direction;

a downstream mandrel element having a non-constant cross-section in axial direction;

an intermediate mandrel element positioned between the upstream and downstream mandrel elements;

wherein the downstream mandrel element comprises flaring sides and tapering sides and the intermediate mandrel element is recessed relative to the upstream mandrel element to allow the upstream part of a sleeve to move radially inward when the downstream part of the sleeve moves along the flaring sides of the downstream mandrel element.

Since the sleeve may move radially inward when the sleeve is widened as it travels along the mandrel, the sleeve may travel smoothly along the mandrel. Furthermore, the recess allows the mandrel to have flaring sides of considerably large flaring angle (relative to the axial direction of the mandrel) compared to the length of the mandrel so that a comparatively short mandrel may be used to sleeve containers having a large length/width ratio.

In embodiments of the invention the mandrel is shaped so that when a downstream end of the sleeve has reached a position wherein the mandrel has its final shape, the upstream end of the sleeve has space to move radially inward. More specifically, the mandrel may be shaped so that when the downstream end of the sleeve has reached the flaring sides of the mandrel, the upstream end of the sleeve has space to move radially inward. The shape of the mandrel therefore facilitates a smooth guidance of the sleeve material along the mandrel, even in situations wherein the degree of obliqueness of the flaring sides relative to the axial direction is considerable.

In embodiments of the invention the upstream mandrel element has a substantially constant circumference in axial direction. More precisely, the circumference of the upstream mandrel element in a plane perpendicular to the axial direction of the mandrel may be substantially constant in axial direction. Furthermore, in embodiments of the invention, the upstream mandrel element has a substantially constant cross-section in axial direction, for instance a circular or oval cross-section, preferably a cross-section that corresponds to the cross-section of the sleeve traveling along the outer surface of the upstream mandrel element.

In embodiments of the invention the sleeve may move freely inward, i.e. without obstruction by the outer surface of the mandrel, as a result of the presence of the recess(es) in the intermediate mandrel element. The intermediate mandrel element is recessed relative to the upstream mandrel element positioned above (when the sleeve is shot downward) or below (when a sleeve is shot upward) the intermediate mandrel element. The recess may be partly or may be along the entire circumference of the intermediate mandrel element.

Flaring sides may be sides that extend obliquely outward relative to the axially downstream direction, tapering sides may be sides that extend obliquely inward in a downstream axial direction. In other words, the tapering sides. As used herein the phrase "in axial direction" of the element may signify "at all axially different axial positions" or "over the height of" the element. The term "circumference" may be defined as the length of a line that goes around the mandrel element in a plane perpendicular to the longitudinal axis (i.e. the axial direction) of the spreading unit. The circumference is therefore a 1-dimensional quantity. The term "cross-section" may be defined as a surface of the mandrel element exposed by if a straight cut were to be made through the mandrel element, in a plane perpendicular to the longitudinal axis (=axial direction) of the spreading unit. The cross-section therefore is a two-dimensional quantity. Furthermore, a mandrel element having a "constant cross-section" is defined as a mandrel element having a surface perpendicular to the longitudinal axis of the mandrel element of which the shape and dimensions remain constant over the height of the mandrel element (therefore constant in axial direction).

In an embodiment of the invention the circumference of the upstream mandrel element in a plane perpendicular to the axial direction of the mandrel is substantially constant in axial direction. The upstream mandrel element may have a constant cross-section in axial direction, for instance a circular cross-section, preferably the same circular cross-section in axial direction. In these embodiments the tubular foil material is held comparatively tightly against the outer surface of the upstream mandrel element so that tubular foil material can be smoothly moved over the outer surface of the mandrel.

In embodiments of the invention the circumference of the upstream mandrel element corresponds to the circumference of the mandrel at the transition from the intermediate mandrel element and downstream mandrel element.

In embodiments of the invention the shape of the downstream end of the mandrel corresponds to the target tubular shape of the sleeve. Since the sleeve is in its "end shape" once it leaves the mandrel and therefore does not need to be reshaped during the movement from the mandrel to the container, the sleeve can be arranged more accurately around the container.

In embodiments of the invention the intermediate mandrel element has recessed portions in areas axially in line with the flaring sides compared to areas in line with the tapering sides of the downstream mandrel element. For instance, the intermediate mandrel element may be shaped to be recessed only in areas axially in line with the flaring sides of the downstream mandrel element. For instance, at positions axially above the tapering sides the intermediate mandrel element does not need to be recessed because the sleeve does not need extra space here. At these positions the intermediate mandrel element might even be not recessed at all relative to the upstream mandrel element to better support the sleeve (sideway support). The remaining upstream areas of the intermediate mandrel element may be essentially flush with the outer surface of the upstream mandrel element so as to provide an even better guidance. In other words, the intermediate mandrel element does not need to be recessed along its entire surface. It may be sufficient to have an intermediate mandrel element that only has one or more upstream recessed portions. The circumference of the intermediate mandrel element may be non-constant over the height of the element, for instance small at the upstream (recessed) part and large the downstream part. Furthermore the cross-section of the non-recessed part of the intermediate mandrel element may be the same (for instance, circular, oval, partly circular and partly oval, or the like) over the entire height of the intermediate mandrel element. This may provide a suitable sideway support for the sleeve (not only support at the upper and lower edge). In an exemplifying embodiment the shape of the non-recessed part of the intermediate mandrel element has the same as the shape of the upstream mandrel element.

In embodiments of the invention the spreading unit may comprise a downstream end and a further intermediate mandrel element positioned between the downstream mandrel element and the downstream end, the further intermediate mandrel element being recessed relative to the downstream mandrel element to allow the upstream part of a sleeve to move radially inward when downstream part of the sleeve moves along the downstream end.

In embodiments of the invention the downstream end comprises a substantially constant cross-section in axial direction. At the downstream mandrel portion the sleeve may be substantially free from tensions and/or folds, which may facilitate the ejection of the sleeve in its final, target shape and enable the use of sleeves having only a minimum oversize relative to the container (product). This in turn may lead to better shrink quality and more accurate aligning of the sleeve with respect to the container. In a further embodiment the circumference of the downstream mandrel element, preferably also the circumference of the downstream end, is constant in axial direction. In axial direction, i.e. at each cross-section over the length of the downstream mandrel element, the sleeve may be fully supported in order to reduce skewing or tilting of the sleeve as it is shot towards the second sleeve transfer and container, respectively. In a preferred further embodiment the constant circumference corresponds to the (inner) circumference of the tubular foil material/sleeve to support the sleeve travelling along the mandrel.

In embodiments of the invention the cross-section of the downstream mandrel element is oval over its length. The cross-section becomes more elongated from the upstream to the downstream part so as to push the sleeve outward at the flaring sides and to move inward the sleeve at the tapering sides.

In embodiments of the invention the angle between at least one of the flaring side and the tapering side relative to the axial direction ranges between 3 and 45 degrees, preferably between 3 and 30, more preferably between 3 and 15 degrees. Therefore containers having a large length/width ratio can be handled accurately using a relatively compact spreading unit.

Preferably the mandrel has flaring side areas at the transition between the further intermediate mandrel element and the downstream end. This enables a proper guidance of the downstream end of the sleeve smoothly onto the downstream end and to align the edge of the sleeve to the outer circumference of the downstream end.

In embodiments of the invention the spreading unit comprises a cutting unit arranged for cutting the opened tubular foil material into individual sleeves. The cutting unit may be configured to cut a sleeve at a position above the intermediate mandrel element.

The first sleeve transfer unit may be arranged at the transition between the intermediate mandrel element and the downstream mandrel element and a second sleeve transfer unit may be arranged at the downstream end of the mandrel. The sleeving device also comprises further (driving) wheels arranged on the frame, the further wheels together with the (mandrel) wheels being able to grip the foil material and to move the gripped foil material in downstream direction. One of the sleeve transfer units or both of them may comprise a pair of wheels arranged in the mandrel at opposing positions and arranged to discharge a sleeve in a downstream direction.

In a specific embodiment the wheels of the first sleeve transfer unit and/or second sleeve transfer unit are tangent to the outer surface of the mandrel. More specifically, the first transfer unit may be tangent to two surfaces, i.e. an outer surface of the intermediate mandrel element and an outer surface of the downstream mandrel element.

The spreading element may comprise separate mandrel elements or integrated mandrel elements. In an embodiment at least two of the mandrel elements are integrally formed. In other embodiments the mandrel elements are connected to each other.

When a sleeve is shot from the first sleeve transfer to the second sleeve transfer there is a time interval in which none of the driving wheels are in contact with the sleeve. This could result in reliability issues. Furthermore, when a sleeve reaches the second sleeve transfer it needs to arrive with sufficient speed to overcome the friction of the mandrel surface. However, if the speed is too high, a bouncing effect may occur. Bouncing of the sleeve may result in reliability issues as well.

It is also an object of the invention to solve or at least reduce these reliability issues. This and/or any of the other objects of the invention may be achieved according to an aspect of the invention in spreading unit that comprises:
  a mandrel;
  at least one sleeve transfer unit for driving the sleeve along the mandrel, the sleeve transfer unit comprising a first and second wheel arranged at opposing sides of the mandrel;
  a first and second sensor, each sensor arranged close to a wheel and configured to provide a sensor signal representative of the presence of the sleeve;
  a controller for controlling the wheels of the transfer unit individually, based on the sensor signals, so as to control the height position and/or tilt of the sleeve with respect to the mandrel.

In embodiments of the invention the sensors are arranged at the same height position as the wheels or slightly below the wheels. Each sensor can detect the arrival of a part of the sleeve within an area close to the wheels (for instance, right below the wheels). The sleeve transfer unit is arranged at the downstream end of the mandrel, i.e. at the downstream end of the downstream mandrel element or at the downstream end of the downstream end.

By controlling the speed of the wheels a full control on the position of the sleeve can be retained. To ensure that the sleeve reaches the second sleeve transfer with sufficient speed to guarantee friction between mandrel and sleeve to be overcome without producing a bouncing effect, the wheels may be caused to rotate at low speed. In embodiments of the invention the controller therefore controls the sleeve transfer unit to rotate the wheels at a reduced rotation speed before the sleeve reaches the sleeve transfer unit. The wheels are moved in the same direction as the sleeve, preferably at the same speed as or a speed lower speed than the speed of the sleeve travelling along the mandrel, so as to reduce the above-mentioned bouncing effect. By causing the wheels to rotate the sleeve may be "caught" immediately and a bouncing of the downstream edge of the sleeve off of the wheels has become less likely Subsequently, the two sensors will be able to independently level out the sleeve by stopping the wheel rotation once the sensor is blocked by the sleeve. In this way, the position of the sleeve in height is also fully controlled, which is beneficial for a reliable application. Therefore, in accordance with embodiments of the invention, the controller is configured to stop the rotation of a first wheel when a first sensor associated with the first wheel arranged near a first side of the mandrel detects the presence of the sleeve and/or to continue rotation of the second wheel as long as a second sensor associated with the second wheel arranged near a second side of the mandrel has not detected the presence of the sleeve. The controller may be further configured to stop the rotation of the second wheel when the second sensor detects the presence of the sleeve as well. As soon as the sleeve is detected by both sensors, the controller may control the transfer unit to accelerate the sleeve and shoot the sleeve towards the container.

As mentioned above, in case a sleeve is shot from the first to the second sleeve transfer with very high speeds, it is able for the sleeve to deform around the wheels of the second sleeve transfer. This can cause the sensors below the mandrel to generate a false trigger. In order to reduce this effect the sensors should be positioned in line with the wheels of the second sleeve transfer. In accordance with an embodiment the sensors may therefore be configured to detect the presence of a sleeve in a direction essentially parallel to the wheels, i.e. in a direction perpendicular to the rotation axis of the wheels. The detection is preferably done close to the contact area between a wheel and sleeve because deformations causes by the wheel close to the contact area should be detectable.

Additionally, positioning the sensor as far apart from one and other as possible may result in an improved leveling out accuracy. The horizontal position of the wheels is dependent on the shape of the product and is therefore a variable which needs to be adjusted for each product. The horizontal and vertical position of the sensors can be fixed with respect to this wheel positions, preventing an extra adjustment, minimizing customer handling.

In an embodiment the downstream end of the mandrel has a substantially elongated shape in cross-section and the sensors are mounted along the long side of the mandrel and/or, preferably, along the short side of the mandrel.

In an embodiment of the invention the sensors are arranged at fixed positions relative to the driving wheels of the sleeve transfer unit, the sensors preferably forming part of the sleeve transfer unit. This means that no adjustment of the sensors for differently shaped containers (i.e. for different mandrels) is needed.

The at least one wheel of the transfer unit may be spring-mounted, preferably mounted on leaf springs on or in the mandrel.

According to another aspect of the invention a container sleeving device for arranging sleeves around containers conveyed on a conveyor is provided. The sleeves are formed of flattened tubular foil material. The container sleeving device may comprise:
  a spreading unit;
  a frame for supporting the mandrel of the spreading unit;
  a foil supply for supplying foil to the mandrel;
  one or more sleeve transfer units for transporting the sleeves in downstream direction along the mandrel, a sleeve transfer unit comprising:
    a set of guide wheels arranged in the mandrel;
    a set of drive wheels connected to the frame and arranged so as to transport the sleeve between the drive wheels and guide wheels.

The drive wheels may be arranged below the guide wheels so as to support the spreading unit on the frame and/or the lower guide wheels may be resiliently mounted.

Further features, advantages and details of the invention will be elucidated in the following description of several embodiments thereof. In the description reference is made to the figures, which show:

FIG. 2 is a side view of the mandrel 2 of FIG. 1 including a sleeve (S).

FIG. 3 shows a cross section of a typically elongated container shape 16 and the shape 17 of the sleeve that is being arranged around this container.

Figure 1:
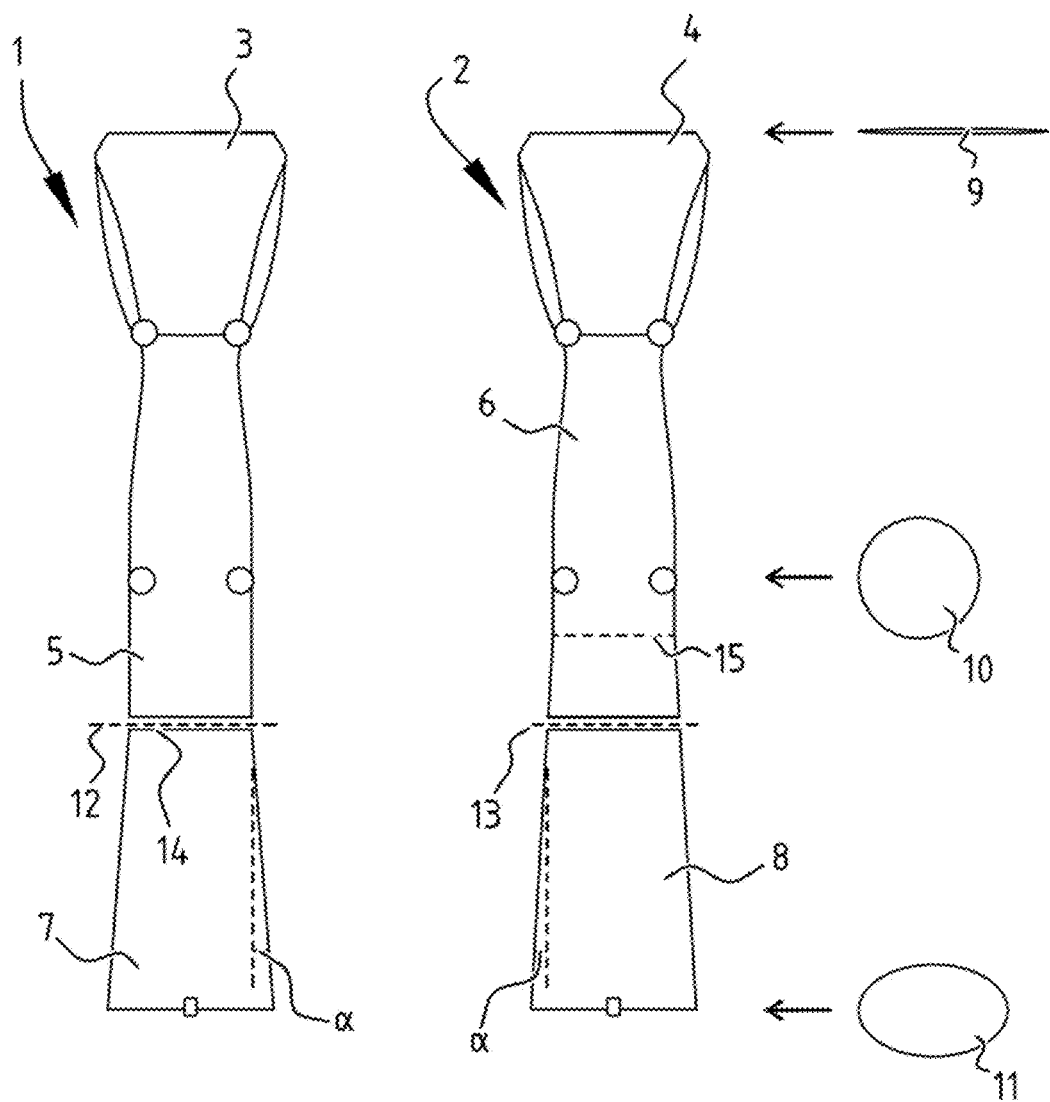
FIG. 1 shows two examples of existing tapered mandrels 1,2 that are used to provide sleeves having a non-round cross section.
Figure 4:
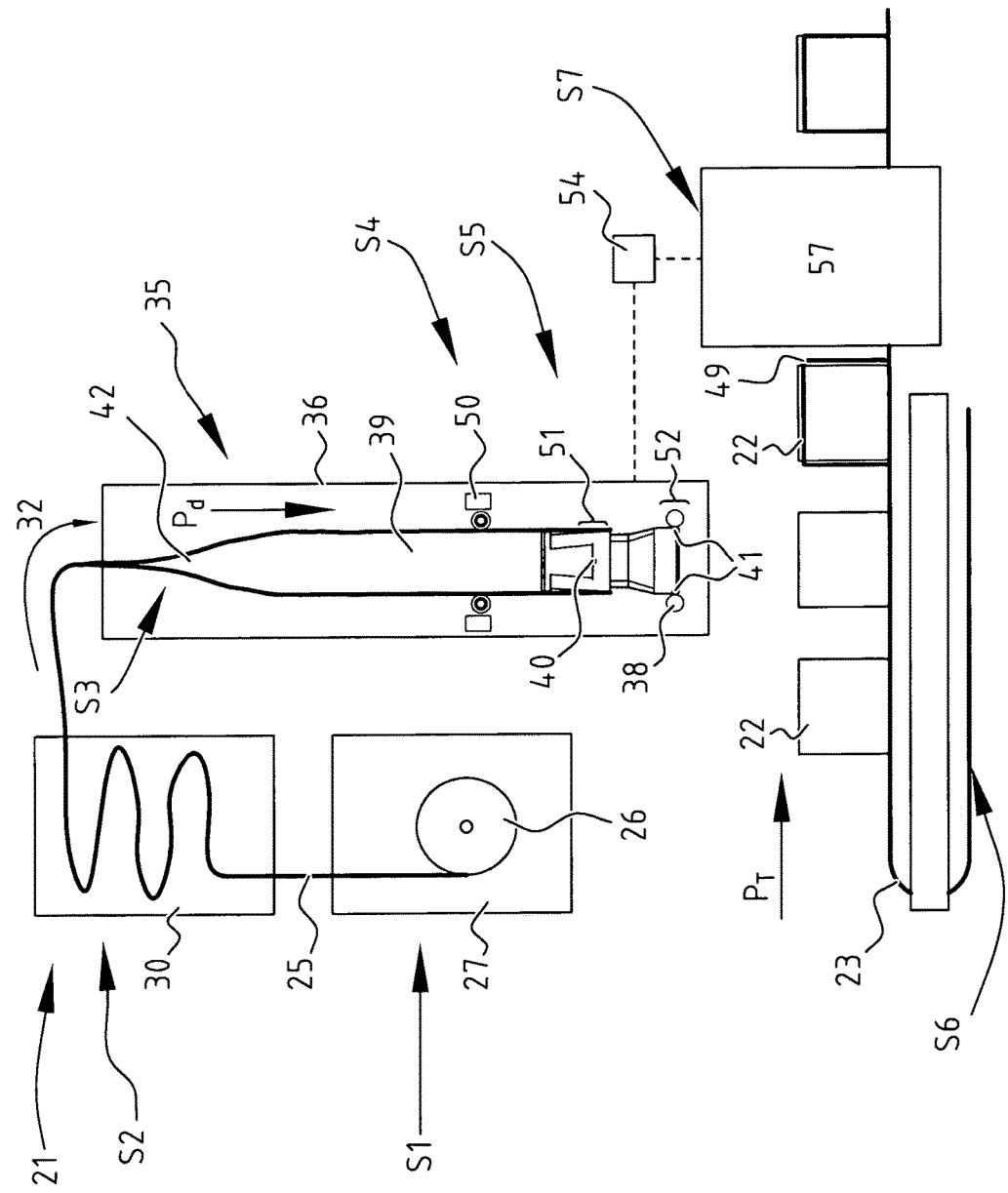
Figure 5B:
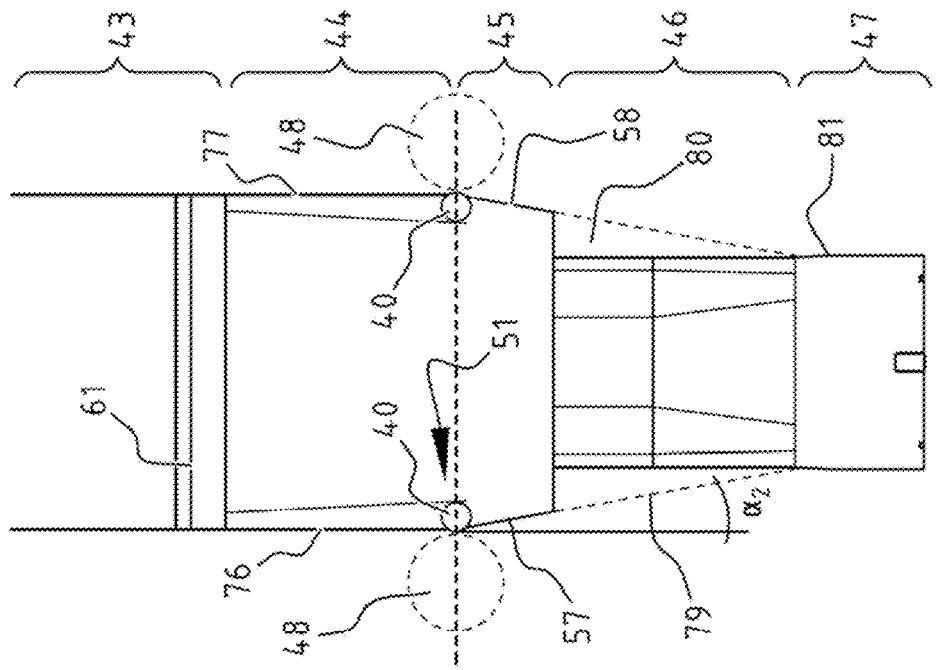
Figure 5A:
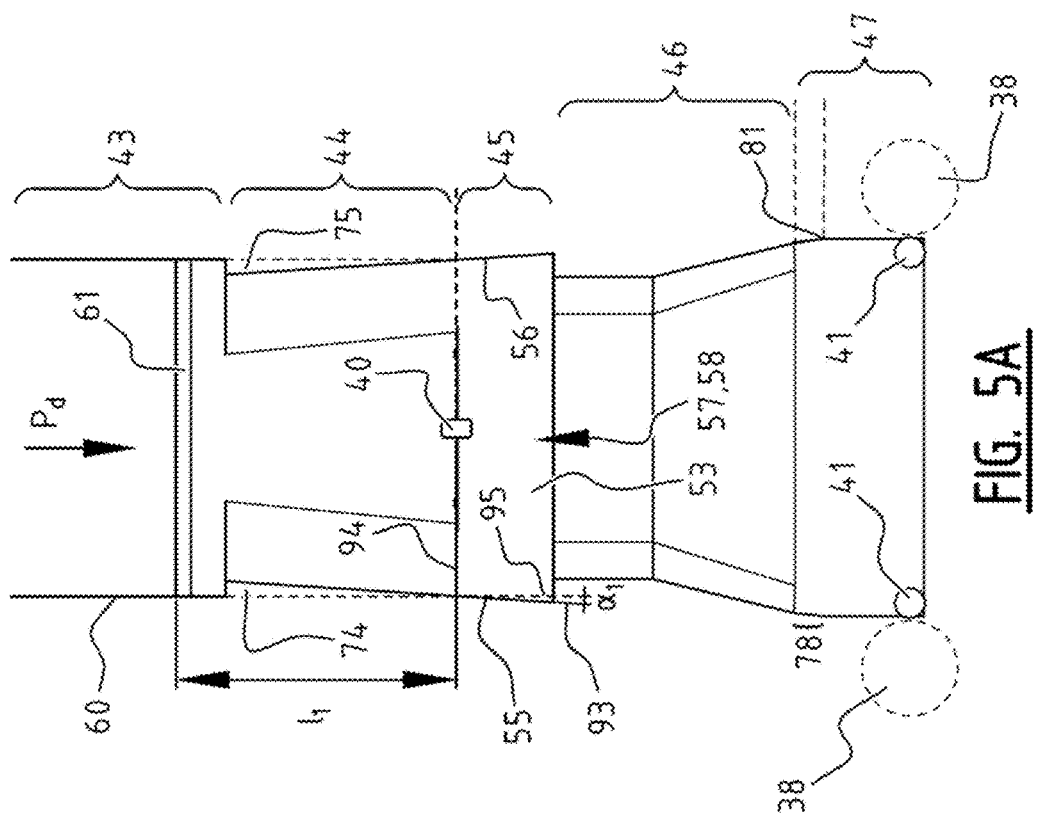
Figure 5C:
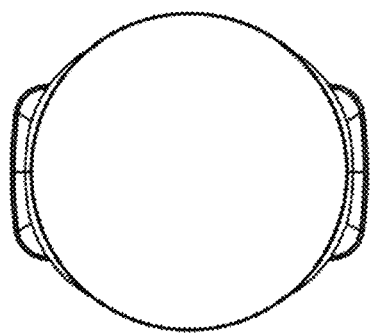
Figure 8:
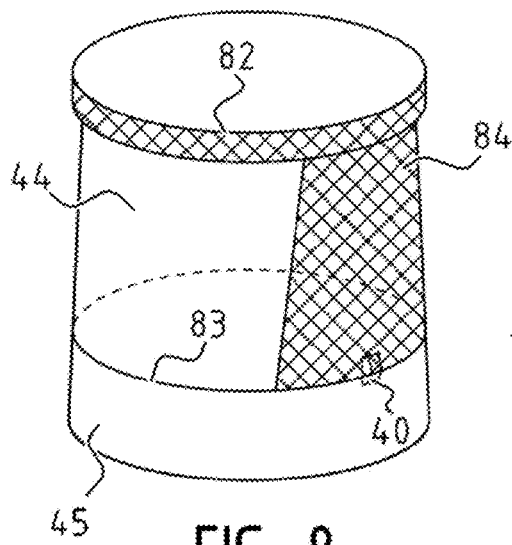
Figure 9:
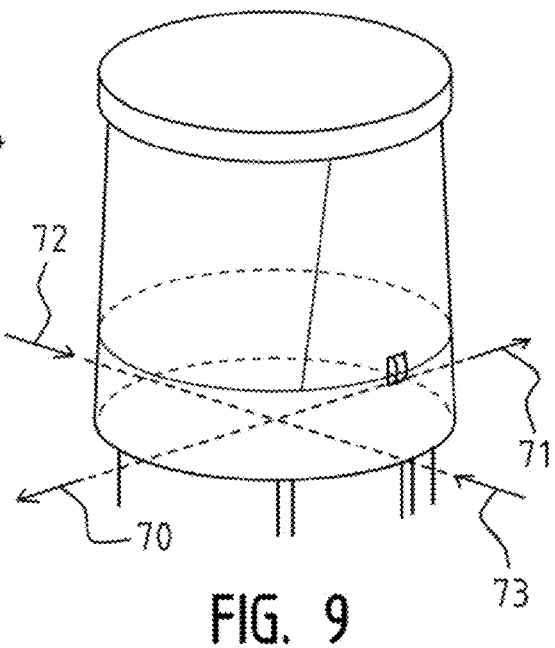
Figure 10:
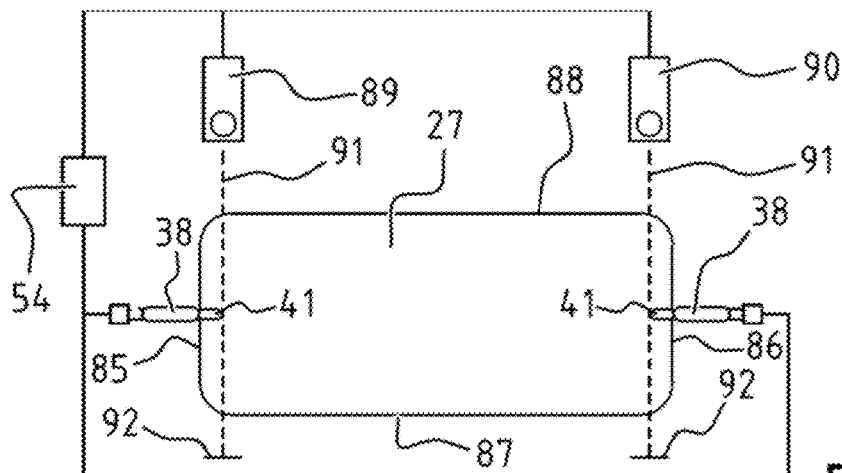
Figure 11:
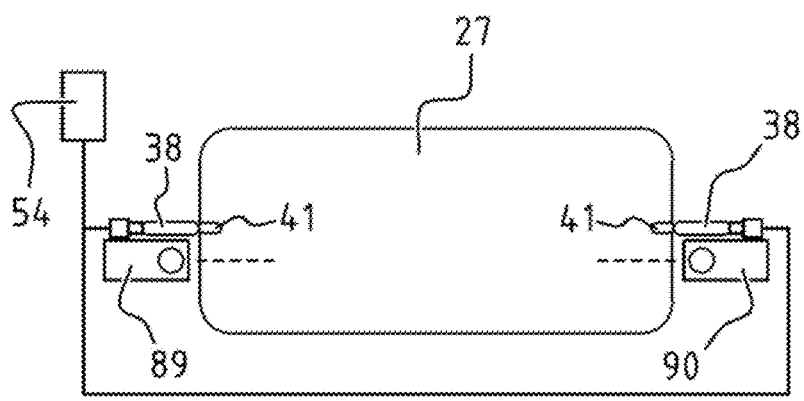
Figure 12:
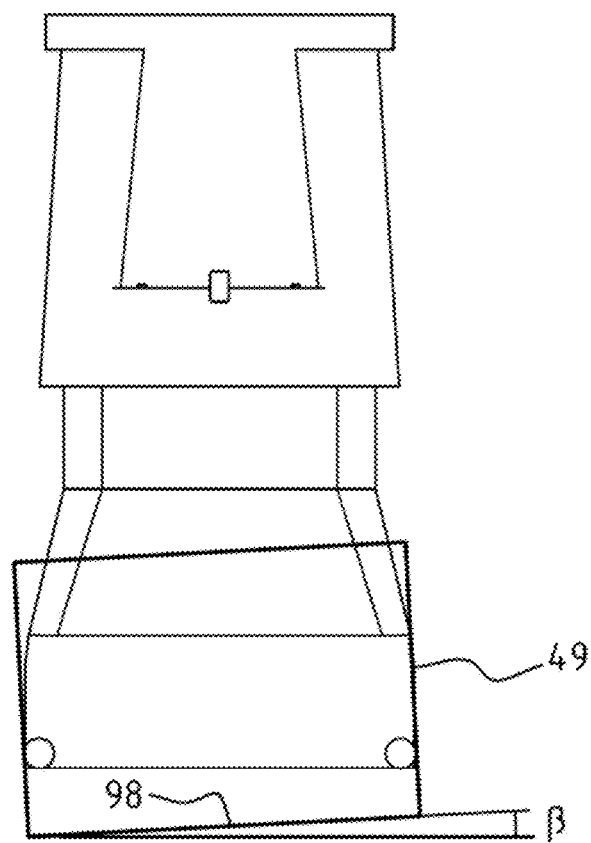
Figure 13:
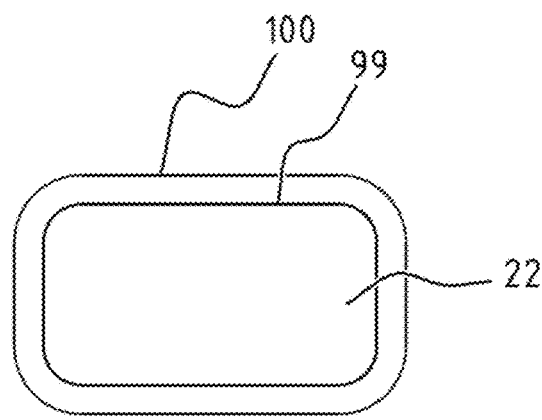
Figure 14C:
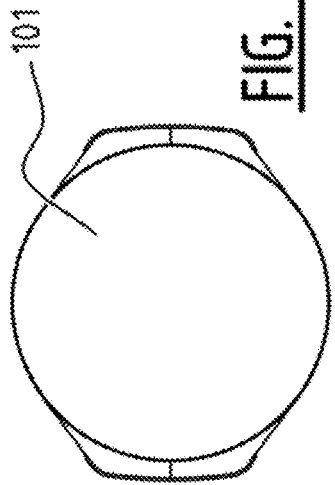
Figure 14B:
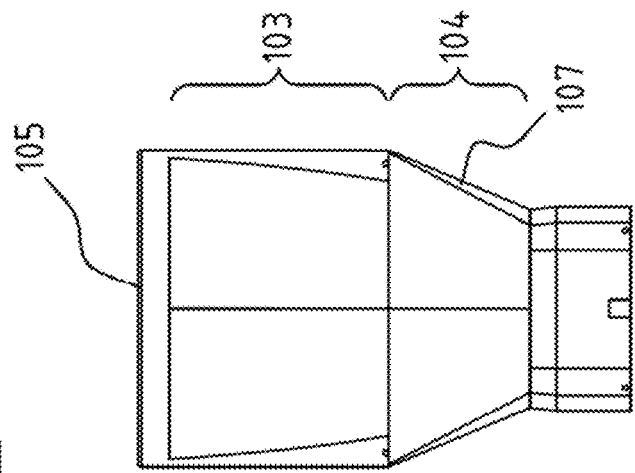
Figure 14A:
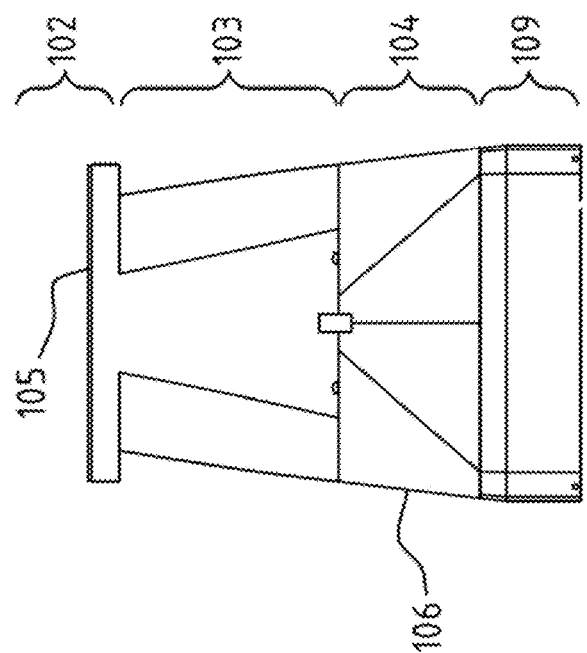

FIG. 4 a schematic side view of an embodiment of a sleeving device according to the invention;

FIGS. 5A, 5B and 5C respectively a front view, side view and top view in cross-section of an embodiment of a spreading unit of the sleeving device of FIG. 4;

FIGS. 6A-6E show respectively a part of the front view of FIG. 5a including a piece of foil material (sleeve) travelling downward along the outer surface of the mandrel, at consecutive moments in time;

FIGS. 7A-7E show respectively a part of the side view of FIG. 5b including a piece of foil material (sleeve) travelling downward along the outer surface of the mandrel, at the same consecutive moments in time as FIGS. 6A-E;

FIG. 8 a view indicating the areas at which a sleeve is supported during movement from the upstream mandrel element to the downstream mandrel element;

FIG. 9 a view indicating the radial directions in which a sleeve is forced to move when it travels in downstream direction along the mandrel;

FIG. 10 a bottom view of the mandrel according to an embodiment of the invention, provided with two sensors for sensing the presence of foil material (sleeve);

FIG. 11 a bottom view of another embodiment of the mandrel, provided with similar sensors arranged on different positions relative to the bottom end of the mandrel;

FIG. 12 shows a front view of a mandrel wherein a sleeve has been tilted relative to the bottom end of the mandrel;

FIG. 13 a schematic view of a sleeve arranged around a container wherein the device and method according to the present invention have been used;

FIGS. 14A, 14B and 14C show respectively a front view, side view and top view of a further embodiment of a spreading unit of the sleeving device.

Referring to FIG. 4 a container sleeving (labelling) device 21 for labelling containers 22 travelling on a conveyor 23 is shown. The containers 22 could be supported on any type of a conveyor, for instance a driven endless belt as shown in FIG. 4, a track from which the containers are suspended or similar types of conveyors. The sleeves comprise of foil material stored on a foil roll 26 provided in a foil stock 27. The foil material 25 can be formed by a flattened tubular foil material, preferably of a heat shrinkable type, that is fed (step S1) from the foil stock 27 to a foil buffer 30. Buffer 30 allows buffering (step S2) of the foil material, e.g. when a roll 27 is to be replaced by a new roll of material in order to provide a continuous feed 32 of flattened tubular foil material to a stationary spreading unit 35. The spreading unit 35 is mounted to a frame 36, more specifically is supported by several sets of drive wheels. One set of drive wheels 38 only is shown in FIG. 4. The spreading unit 35 comprises an elongated mandrel 39. In recesses in the mandrel a first set of opposing wheels are rollers 40 and a second set of opposing wheels 41 have been provided. The mandrel is supported on the frame, more specifically on the drive wheels 38 thereof.

The flattened foil material 25 is opened (step S3) using the upper tip 42 of the mandrel 39. The tip forms the inlet side of the mandrel 39 and is configured as a flat element that widens in downstream direction (direction $P_d$). The next part of the mandrel 39 is formed by an upstream mandrel element 43, followed by an intermediate mandrel element 44, a downstream mandrel element 45, a further intermediate mandrel element 46 and a downstream end 47. These mandrel elements are configured to further move (step S4) the foil material downward, form individual sleeves and to discharge (step S5) the individual sleeves to the containers passing by on the conveyor 23.

The spreading unit 35 comprises a cutting unit 50 for cutting sleeves 49 from the opened tubular foil material into individual sleeves. The cutting unit 50 may be of any type, for instance a rotary cutter having two or more rotating blades for cutting the sleeve or a guillotine cutter, such as the cutter described in EP 2 551 206 A1, or any other type of cutting unit suitable for cutting the sleeves at the desired cutting length (CL) during transport of the foil material along the mandrel 39.

The above mentioned drive wheels connected to the frame and wheels 40 together form a first sleeve transfer unit 51 for transporting the sleeve held between the drive wheels and wheels 40 in downward direction. Similarly, a second sleeve transfer unit 52 is provided at the bottom end of the mandrel 39 and comprises of the opposing drive wheels 38 and the mandrel wheels 41. In the embodiment shown the drive wheels of the first sleeve transfer are arranged to extend in a double tangential alignment with the outer surfaces of the mandrel (see for instance FIG. 5B), i.e. the circumferential surface of the wheels are aligned with the outer surfaces upstream and downstream of the wheels. The wheels of the second sleeve transfer are arranged to extend in a single tangential alignment with the outer surface of the mandrel (see for instance FIG. 5A, i.e. the circumferential surface of the wheels are aligned with the outer surface of the mandrel upstream of the second sleeve transfer.

Between the drive wheels and mandrel wheels the foil material (that is the sleeve) is accelerated to shoot the sleeve 49 towards the containers passing below the spreading unit 35 (as is shown in FIG. 4) or, in other embodiments, over the spreading unit (in embodiments wherein the sleeve is ejected in upward direction towards containers passing by, for instance containers suspended with their upper rims from a overhead conveyor.

As mentioned above, the wheels 38, 41 are arranged to physically engage the cut sleeve 49, accelerating the sleeve 49 and ejecting the same (step S5) from the mandrel of the container sleeving device 21. A suitable controller 54 is arranged to operate the drive wheels and to synchronise the ejecting of a sleeve with the motion of the container 22. In other words, a sleeve is shot when a container is about to align with the spreading unit 35.

The sleeves 49 are cut and shot over the containers 22 supported and conveyed (S6) in direction $P_T$ by the conveyor 23. The conveyor 23 transport the sleeve container 22 further in the transport direction, e.g. into a steam oven 57. In this steam oven 57 steam will heat the sleeves arranged around the containers and shrink (step S7) the sleeve around the container, providing a labelled container. In a subsequent step further operations can be performed, for instance a drying process.

Advantages of the setup according to FIG. 4 are high speed, accuracy and reliability. The illustrated container sleeving device allows handling of thin foil material having a thickness of 60 or 70 micrometer or less, even in situations wherein the container are relatively large and have an elongated shape in cross section.

FIGS. 5A-5C show the embodiment of the mandrel 39 in more detail. The upstream mandrel element 43 has a circular cross section and this cross section is essentially constant in the axial (downstream) direction $P_d$, i.e. the cross section is essentially the same over the length of the upstream mandrel element 43. Preferably, the circumference of the upstream mandrel element 43 corresponds to the circumference of the tubular foil material. In this way the upstream mandrel element 43 may properly support the tubular foil material around its outer surface 60 thereof. However, in other embodiments the circumference of the upstream mandrel element 43 may be somewhat smaller than the circumference of the tubular foil material.

Between the upstream mandrel element 43 and the intermediate mandrel element 44 arranged downstream of the upstream mandrel element 43 or in the upstream mandrel element 43 itself, the earlier mentioned cutting unit 50 is arranged. FIGS. 5A-5C show more details of a circumferential slot 61 in which one or more blades of the cutting unit 50 may be arranged in other to cut the foil material circumferentially so that an individual sleeve 49 is formed.

At the boundary between the intermediate mandrel element 44 and downstream mandrel element 45 the above mentioned wheels 40 of the first sleeve transfer unit 51 are positioned, at opposing sides of the mandrel. The cross section of the intermediate mandrel element 44 at the axial position of the first transfer unit 51 is circular or oval and, preferably, the circumference of the intermediate mandrel element 44 at this position is identical to the circumference of the upstream mandrel element 43. At intermediate positions between the upstream mandrel element 43 and downstream mandrel element 46 recesses 74,75 are formed in the intermediate mandrel element so as to provide space for the upstream part of the sleeve to move radially inward. In embodiments of the invention the remaining parts of the intermediate mandrel element, herein also referred to as the non-recessed parts 76,77 (cf. FIG. 5B) of the intermediate mandrel element, are shaped so as to have a circular contour at the top if the upstream mandrel element is circular or to have an oval contour at the top if the upstream mandrel element is oval, so as to follow the contour of the upstream mandrel element. Furthermore, the remaining (non-recessed) parts of the intermediate mandrel element may have a circular or oval contour near the bottom. In a further embodiment, the cross-section of the non-recessed parts 76,77 of the intermediate mandrel element is circular or oval over the height of the intermediate mandrel element. In these embodiments the sleeve remains supported by the (non-recessed parts 76,77 of the) intermediate element as the sleeve travels along the spreading unit.

The axial distance ($l_1$) between the circumferential cutting slot 61 of the cutting unit 50 and the first transfer unit 41 is slightly smaller than the desired cutting length (CL) of the sleeve. This length ($l_1$) ensures that the foil material is pinched between the mandrel wheels 40 and driving wheels 48 of the first transfer unit 51 before the foil material is cut to form a sleeve. Furthermore, the sleeve is supported at several important positions, i.e. at the top near the cutting position (hatched area 82 of FIG. 8), at the bottom near the first transfer unit (area 83, FIG. 8) and the hatched area 84 corresponding to the position of the non-recessed parts 76,77. This results in full (position) control of the tubular foil material at the moment of cutting the material into an individual sleeve, so that a proper positioning of the sleeve relative to the cutting unit can be ensured. The cutting of the foil material results in a cutting line which has the desired straight shape. In other words, no tapering or other type of reshaping of the sleeve is performed before the cutting process has been completed.

After the cutting process, the sleeve is to be reshaped into its target shape. Due to the specific elongated form of the container the target shape of the sleeve should be elongated as well in order to be able to arrange the sleeve around the container. To this end the sleeve 49 moves along the downstream mandrel element 45 arranged downstream of the intermediate mandrel element 44. The downstream mandrel element 45 has a non-constant cross section in axial direction, i.e. a non-constant cross section over its length. Two opposing sides 55,56, more specifically the opposing sides facing the containers travelling on the conveyor 23, are flared relative to the axial direction ($P_d$) which means that during downstream movement of a sleeve its dimensions in the direction of travel of the containers is increased gradually. At the other two opposing sides 57, 58, more specifically the sides 57,58 extending perpendicular to the opposing sides 55,56, the downstream mandrel element 45 is tapered inwardly, meaning that during movement of the sleeve its dimensions perpendicular to the direction of travel of the containers is gradually decreased (see FIG. 5B). Preferably, the circumference remains constant in axial direction, the circumference preferably corresponding to the circumference of the sleeve 49. This ensures that while travelling along the downstream mandrel element 45, the sleeve is properly supported by the outer surface 53 of the downstream mandrel element 45.

Starting from the situation depicted in FIGS. 6A, 7A, the sleeve 49 travels downward along the tapering and flaring sides of the downstream mandrel element 45, so that the downstream end of the sleeve 49 is moved outward at the flaring sides 55, 56 and moving inward at the tapering sides 57, 58. In order for the angle ($\alpha_1$) between the axial direction ($P_d$) and the flaring sides of the mandrel elements (cd. FIG. 5A) to be large, for instance larger than 3 degrees, space is to be provided for the upstream part of the sleeve 49. Therefore the intermediate mandrel element 44 is recessed (cf. recesses 74,75 shown in FIG. 5A) in order to provide space for the sleeve 49 as it passes the intermediate mandrel element 44. The motion of the upstream part of the sleeve as it is transported past the downstream end of the upstream mandrel element 43 is created by the tapered sides 55, 56 of the mandrel below the first sleeve transfer unit 51, which pushes the sleeve in outward directions (directions 70,71 shown in FIG. 9). Since the circumference of this part of the mandrel corresponds to the circumference of the sleeve (i.e. the diameter of the sleeve is equal to the diameter of the mandrel and a predefined clearance between the mandrel outer surface and the sleeve inner surface), the sleeve part transported along the inwardly tapering sides 57, 58 of the mandrel element 45 will move inward, i.e. directions 72,73 shown in FIG. 9. In practice both the angle ($\alpha_1$) between the axial direction ($P_d$) and the flaring sides of the mandrel elements (ed. FIG. 5A), i.e. de angle between an imaginary line 93 along the flaring side of the downstream mandrel element 43 and an imaginary line 95 defined along the side surface of the element 43 and passing through the position defined by the crossing of a first line 94 defining the height position of the first sleeve transfer unit 51 and the line 93, and the angle ($\alpha_2$) similarly defined between the axial direction ($P_d$) and the tapering sides of the mandrel elements (cd. FIG. 5B) may be in the range of 0 tot 45 degrees. In embodiments of the invention the angle may be in the range between about 3 and 30, preferably between 3 and 15 degrees, in order to provide an elongated sleeve using a relatively short mandrel.

In FIGS. 6A, 6B and 7A,7B is shown that due to the presence of the recesses 74,75 in the upstream part of the intermediate mandrel element 44, the upstream part of the sleeve 49 has space to move inward (direction $F_{in,1}$, FIG. 6B). The movement is caused by the movement of the downstream part of the sleeve 49 which is moving outward as the downstream part moves over the flaring sides 55,56. If such recesses 74,75 were not available, the sleeve 49 would likely jam on the mandrel 39, especially when the angle between the tapered sides of the mandrel and the axial direction is relatively large. Similarly, referring to FIGS. 7A and 7B, the downstream part of the sleeve 49 travelling along the inwardly tapering sides of the downstream mandrel element cause the upstream part of the sleeve to move in a radially outward direction (direction $P_{out,1}$).

The downstream mandrel element 45 ensures that the sleeve 49 is fully supported, essentially not able to twist or skew and is transported towards the second sleeve transfer unit 52. FIGS. 6C,7C show the stage wherein the upper part of the sleeve 49 is about to leave the position of the first sleeve transfer unit 51. As the sleeve is travelling further in downstream direction, the downstream part of the sleeve 49 will eventually reach the downstream end 47. This is depicted in FIGS. 6D and 7D.

The upstream portion of the downstream end 47 is provided with a guiding surface 78 so as to smoothly guide the downstream edge of the sleeve 49 onto the mandrel element 47, as is shown in FIG. 6D. The downstream end 47 preferably has a constant cross section in axial direction, i.e. the cross section is essentially equal for all cross sections and therefore is equal over its length. Furthermore the circumference of the downstream end 47 preferably corresponds to the circumference of the sleeve so that the sleeve is properly supported when it is travelling along this part of the mandrel. The downstream end 47 may have the target shape that corresponds more or less to the shape of the containers to be sleeved. When the circumference and cross section of the downstream end 47 are essentially the same, the sleeve can be shot right downward (or upward) while it is in its final, essentially tension-free shape. No further reshaping is needed before the sleeve is shot towards the container.

Referring to FIG. 7D, when the downstream part of the sleeve is travelling further downstream, the upper part of the sleeve should be given sufficient space to move inward (direction $P_{in,2}$). This is made possible by the recesses 79,80 present in the further intermediate mandrel element 46. More specifically, at the point 81 wherein the downstream end 47 starts its final, target shape, the upper part of the sleeve 49 should be able to move radially inward ($P_{in,2}$).

The recesses 79,80 do not need to be present around the total circumference of the further intermediate mandrel element 46. Only at the positions wherein the sleeve 49 moves inward (FIG. 7D), the recesses need to be present. At the other sides of the sleeve, the upstream part of the sleeve will move slightly radially outward ($P_{out,2}$, FIG. 6D) and here a recess does not need to be present.

Figure 6E:
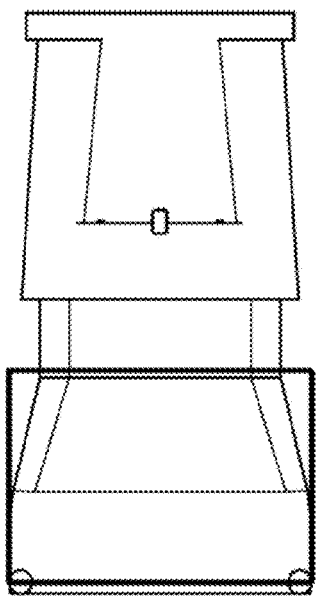
Figure 7E:
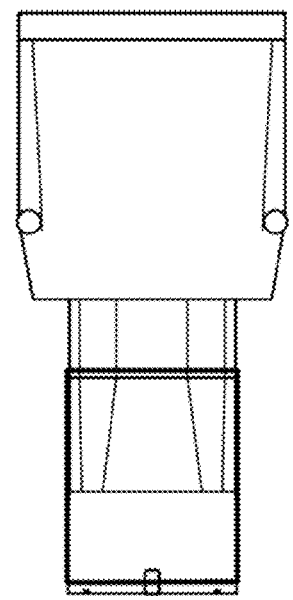

FIGS. 6E and 7E show the sleeve wherein the downstream end has reached the second sleeve transfer unit 52. In this position, the sleeve has its final, target shape and the lower part of the sleeve is fully supported by the downstream end 47. In this position the sleeve is essentially free from tension and fully extends in an axial direction only. The sleeve now is ready to be shot towards the container by the second sleeve transfer unit 52.

When the sleeve 49 is shot from the first sleeve transfer unit 51 to the second sleeve transfer unit 52, there is a moment that none of the wheels of the transfer units are in contact with the sleeve. This could result in reliability issues. In order to ensure that the sleeve 49 reaches the second sleeve transfer unit 52, it needs to be shot with sufficient force to guarantee that the friction between the mandrel and the sleeve 49 may be overcome. However, when the first sleeve transfer unit 51 transfers the sleeve 49 with a large force in the direction of the second sleeve transfer unit 52, the downstream end of the sleeve 49, may have a relatively large speed. This high speed may cause the downstream end of the sleeve 49 to bounce from the wheels 38, 41 of the second sleeve transfer unit 52. This may cause the sleeve on the downstream end 47 to be tilted inadvertently.

According to embodiments of the invention therefore the wheels 41, 38 of the second sleeve transfer unit 52 are controlled by the controller 54 to rotate (in the direction travel of the sleeve). In practice the rotation speed of the wheels 38, 41 can be at a low level, at least relative to the rotation speed in a later stage wherein the sleeve is to be ejected towards the containers. The inventors have found that when the wheels 38,41 are rotated (slightly), the bouncing effect may be reduced considerably or even vanish so that the sleeve can be moved along the mandrel end in a more controlled manner.

In order to control the position of the sleeve 49 in height as well, according to embodiments of the invention, for instance the embodiments shown in FIGS. 10 and 11, sensors are added which may be controlled to independently to level out the sleeve by stopping the wheel rotation of wheels 38, 41 or at least reduce their rotation speed once a sensor is blocked by the sleeve.

FIG. 10 shows a bottom view of the downstream end 47,109. The mandrel has a substantially elongated cross section. Ideally, this cross section corresponds to the cross section of the container to be sleeved (in practice the cross section of the sleeve is slightly larger). The elongated cross-section defines two relatively short side surfaces 85,86 and two relatively long side surfaces 87,88. Along the short side surfaces 85,86 of the downstream end 47 the two mandrel wheels 41 are shown schematically. The figure further shows two sensors 89 and 90 arranged slightly below the bottom of the downstream end 47 and detecting the local presence of a sleeve. For instance, the sensor 89 may be a laser projecting a laser beam slightly below the bottom of the downstream end 47. The laser beam 91 is reflected by a reflector 92 and the reflection can be detected by the sensor 89,90. When a sleeve part is present in the trajectory of the first laser beam, the sensor 89 detects its presence and sends a sensor signal to the controller 54. The second sensor 90 is able to detect the presence of the sleeve in the trajectory of the second laser beam in a similar manner. In other embodiments different types of sensors may be used, for instance reflectorless laser sensors or the like.

Sensors 89 and 90 are connected to the controller 54 which in turn controls the drive motor of the drive wheels 38. Positioning the sensors 89,90 as far apart as possible may result in a high levelling out accuracy. When for instance the left part of a sleeve 49 is travelling with a higher speed than the right part of the sleeve, it is the left sensor 89 which first determines the presence of the sleeve. Upon receipt of the sensor signal from the first sensor 89, the controller 54 controls the left drive wheel 38 to stop rotating so that the left part of the sleeve will stop moving. In the meantime, the right part of the sleeve will continue along the mandrel until also the second, right sensor 90 senses the presence of the sleeve. The controller 54 may then decide that also the right drive wheel 38 is stopped. In this way a tilted sleeve can be brought to a level position.

Once both edges of the sleeve 49 have been properly positioned and the controller is aware of the imminent arrival of a container on the conveyor (through receipt of sensor signals from further sensors (not shown)), the controller 54 controls the drive wheels 38 to simultaneously increase their speed so that the sleeve is ejected towards the container.

In an embodiment the sensors 89,90 are an integral part of the second transfer unit 52 so that the horizontal and vertical positions of the sensors can be easily fixed with respect to the positions of the respective wheels 41. This prevents an extra adjustment when the transfer unit 52 is to be adapted to a new, differently shaped container.

In case the sleeve is shot from the first to the second sleeve transfer unit with very high speed, it is able for the sleeve to deform around the wheels 41 of the second sleeve transfer unit 52. This may cause the two sensors below the downstream end 47 to generate a false trigger. In order to reduce the risk of such false trigger, in another embodiment of the invention, the sensors 89,90 are positioned substantially in line with the wheels 41 of the second transfer unit 52. This embodiment is shown in FIG. 11. In other embodiments the sensors are positioned obliquely with respect to the wheels of the second transfer unit 52.

When the wheels 41 of the second sleeve transfer unit 52 are in line with the transport direction $P_T$ of the containers, which is the case for instance in the arrangement of FIG. 4, the wheels of the transfer unit may be controlled in such a way that the sleeve 49 is tilted to some extent. This is shown in FIG. 12. For instance, by controlling the driving wheels 38 of the second transfer unit 52 such that the rotation speed of the left hand wheels 41 rotate with a higher speed than the right set of wheels, the sleeve 49 may be tilted. The tilt angle (β) defined by the lower edge 98 of the sleeve 49 and the horizontal direction may vary, for instance in a range between 1 and 45 degrees or even 60 degrees. In this respect reference is made to document WO 2011/104917 A, the content of which is herein incorporated by reference. The document describes situations wherein such tilting of the sleeve 49 is beneficial for sleeving containers of specific shape.

FIGS. 14A-C show a portion of a further embodiment of the present invention. In this embodiment the mandrel 101 comprises an upstream mandrel element 102, an intermediate mandrel element 103 and a downstream mandrel element 104. The upstream mandrel element 102 may have a circular cross section and this cross section is essentially constant in the axial (downstream) direction, i.e. the cross section is essentially the same over the length of the upstream mandrel element 102. Preferably, the circumference of the upstream mandrel element 102 corresponds to the circumference of the tubular foil material so that the upstream mandrel element 102 may provide a suitable support for the tubular foil material around its outer surface. Between the upstream mandrel element 102 and the intermediate mandrel element 103 or in the upstream mandrel element 102 a cutting unit 105 is arranged.

The downstream mandrel element 104 comprises flaring sides 106 (FIG. 14A) and tapering sides 107 (FIG. 14B) and the intermediate mandrel element 103 is recessed relative to the upstream mandrel element 102 to allow the upstream part of a sleeve (not shown) to move radially inward when the downstream part of the sleeve moves along the flaring sides of the downstream mandrel element. In the embodiment of FIGS. 14A-C the circumference of the upstream mandrel element 102 may be selected to correspond to the circumference of the mandrel at the transition from the intermediate mandrel element and downstream mandrel element. However, in other embodiments the circumferences may differ. Furthermore, the shape of the downstream end 109 of the mandrel 101 corresponds to the target tubular shape of the sleeve so that practically no reshaping needs to be performed during the movement of the sleeve from the mandrel towards the container. Therefore the sleeve can be arranged with high accuracy around the container.

Embodiments of the present invention enable containers to be sleeved with less oversize also for extremely shaped products, for instance with a length/width ratio of 1,5 or more. For instance, referring to FIG. 13 showing a container 22 having outer contour 99, it is clear that the sleeve 100 can be arranged around the container with a relative small amount of oversize, compared to the situation shown in FIG. 3. This enables a better and more accurate orientation of the sleeve with respect to the container and also has a positive effect on the shrink quality that can be achieved in the subsequent heat shrink process. Because the target (final) shape of the sleeve better matches the shape of the container, the sleeve may be applied more easily around the container. Furthermore, since the sleeve is no longer reshaping during movement towards the container, the sleeve is less sensitive to collapsing. Additionally, the length of the mandrel can be kept small, because the new design of the mandrel enables the mandrel to taper/flare at far larger angles than the prior art mandrels and therefore less mandrel length is needed to bring the sleeves to their final shape.

The present invention is not limited to the embodiments thereof and described herein. The rights sought are defined by the following claims, within the scope of which numerous modifications and changes can be envisaged.

The invention claimed is:

1. A spreading unit for a container sleeving device, the spreading unit being configured to spread open flattened tubular foil material to form a sleeve, to bring the sleeve in a target tubular shape and to discharge the sleeve towards a container, the spreading unit comprising:
    a mandrel including:
        an upstream mandrel element configured to spread open the flattened tubular foil material, the upstream mandrel element having a substantially constant circumference in axial direction;
        a downstream mandrel element having a non-constant cross-section in axial direction; and
        an intermediate mandrel element positioned between the upstream and downstream mandrel elements; wherein
    (i) the downstream mandrel element includes flaring sides disposed opposite to each other and tapering sides disposed opposite to each other along a longitudinal length of the downstream mandrel element, and (ii) the intermediate mandrel element is recessed between the upstream mandrel element and the downstream mandrel element: such that an upstream part of a sleeve moves radially inward in response to a downstream part of the sleeve moving along the flaring sides of the downstream mandrel element.

2. The spreading unit as claimed in claim 1, wherein the upstream mandrel element has a constant cross-section in axial direction.

3. The spreading unit as claimed in claim 1, wherein the shape of the downstream end of the mandrel corresponds to the target tubular shape of the sleeve.

4. The spreading unit as claimed in claim 1, wherein the intermediate mandrel element has recessed portions in areas axially in line with the flaring sides compared to areas in line with the tapering sides of the downstream mandrel element.

5. The spreading unit as claimed in claim 4, wherein the remaining upstream areas of the intermediate mandrel element are essentially flush with the outer surface of the upstream mandrel element.

6. The spreading unit as claimed in claim 1, wherein one or more upstream portions of the intermediate mandrel element are recessed.

7. The spreading unit as claimed in claim 1, further comprising
    a downstream end and a further intermediate mandrel element positioned between the downstream mandrel element and the downstream end, the further intermediate mandrel element being recessed relative to the downstream mandrel element such that the upstream part of a sleeve moves radially inward in response to the downstream part of the sleeve moving along the downstream end.

8. The spreading unit as claimed in claim 7, wherein the downstream end comprises a substantially constant cross-section in axial direction.

9. The spreading unit as claimed in claim 1, wherein the circumference of the downstream mandrel element is constant in axial direction.

10. The spreading unit as claimed in claim 1, wherein the cross-section of the downstream mandrel element is oval over its length.

11. The spreading unit as claimed in claim 1, wherein the circumference of the intermediate mandrel element is non-constant over the height of the element.

12. The spreading unit as claimed in claim 1, wherein the cross-section of the non-recessed parts of the intermediate mandrel element are circular and/or oval over the height of the intermediate mandrel element.

13. The spreading unit as claimed in claim 1, wherein the angle ($\alpha 1$, $\alpha 2$) between at least one of the flaring side and the tapering side relative to the axial direction ranges between 3 and 45 degrees.

14. The spreading unit as claimed in claim 1, wherein the mandrel has flaring side areas at the transition between the further intermediate mandrel element and the downstream end.

15. The spreading unit as claimed in claim 1, further comprising a cutting unit arranged for cutting the opened tubular foil material into individual sleeves.

16. The spreading unit as claimed in claim 1, further comprising
    a first sleeve transfer unit arranged at the transition between the intermediate mandrel element and the downstream mandrel element, and
    a second sleeve transfer unit arranged at the downstream end of the mandrel.

17. The spreading unit as claimed in claim 16, wherein at least one of the sleeve transfer units includes a pair of wheels arranged in the mandrel at opposing positions and arranged to discharge a sleeve in a downstream direction.

18. The spreading unit as claimed in claim 16, wherein the wheels of the first sleeve transfer unit and/or second sleeve transfer unit are tangent to the outer surface of the mandrel.

19. The spreading unit as claimed in claim 16, wherein the downstream end of the mandrel is two relatively long side surfaces and two relatively short side surfaces, and wherein the wheels of the second transfer unit are arranged to face the relatively long side surfaces.

20. The spreading unit as claimed in claim 1, wherein at least two of the mandrel elements are integrally formed.

21. The spreading unit as claimed in claim 1, wherein the mandrel is shaped so that when a downstream end of the sleeve has reached a position wherein the mandrel has its final shape, the upstream end of the sleeve has space to move radially inward.

22. The spreading unit as claimed in claim 1, wherein the mandrel is shaped so that when the downstream end of the sleeve has reached the flaring sides of the mandrel, the upstream end of the sleeve has space to move radially inward.

23. The spreading unit for the container sleeving device as defined in claim 1, further comprising:
 a mandrel;
 at least one sleeve transfer unit configured to drive the sleeve along the mandrel, the sleeve transfer unit including a first and second wheel arranged at opposing sides of the mandrel;
 a first and second sensor, each sensor being arranged close to a wheel and configured to provide a sensor signal representative of the presence of the sleeve;
 a controller programmed to control the wheels of the transfer unit individually, based on the sensor signals, so as to control the height position and/or tilt of the sleeve with respect to the mandrel.

24. The spreading unit as claimed in claim 23, wherein the controller is configured to stop the rotation of a first wheel when a first sensor associated with the first wheel arranged near a first side of the mandrel detects the presence of the sleeve and/or to continue rotation of the second wheel as long as a second sensor associated with the second wheel arranged near a second side of the mandrel has not detected the presence of the sleeve.

25. The spreading unit as claimed in claim 23, wherein the sensors are configured to detect the presence of a sleeve in a direction essentially parallel to the wheels.

26. The spreading unit as claimed in claim 23, wherein the downstream end of the mandrel has a substantially elongated shape in cross-section and the sensors are mounted along the long side of the mandrel and/or along the short side of the mandrel.

27. The spreading unit as claimed in claim 23, wherein the sensors are arranged at fixed positions relative to the driving wheels of the sleeve transfer unit.

28. The spreading unit as claimed in claim 23, wherein a the controller is further programmed to control the sleeve transfer unit to rotate the wheels at a reduced rotation speed before the sleeve reaches the sleeve transfer unit.

29. The spreading unit as claimed in claim 23, wherein at least one wheel of the transfer unit is spring-mounted.

30. A container sleeving device for arranging sleeves around containers conveyed on a conveyor, the sleeves being formed of flattened tubular foil material, the container sleeving device comprising:
 a spreading unit as claimed in claim 1;
 a frame for supporting the mandrel of the spreading unit;
 a foil supply for supplying foil to the mandrel; and
 one or more sleeve transfer units for transporting the sleeves in downstream direction along the mandrel, each sleeve transfer unit including:
  a set of guide wheels arranged in the mandrel; and
  a set of drive wheels connected to the frame and arranged so as to transport the sleeve between the drive wheels and guide wheels.

31. The container sleeving device as claimed in claim 30, wherein drive wheels are arranged below the guide wheels so as to support the spreading unit on the frame and/or wherein the lower guide wheels are resiliently mounted.

* * * * *